INVENTORS
ROY K. ANDRES &
JAMES S. HARRIS
BY Charles H. Brown
ATTORNEY

June 18, 1957 R. K. ANDRES ET AL 2,796,460

SWITCHING CIRCUIT

Filed Sept. 29, 1955 2 Sheets-Sheet 2

INVENTORS
ROY K. ANDRES &
JAMES S. HARRIS
BY Charles H. Brown
ATTORNEY

United States Patent Office 2,796,460

Patented June 18, 1957

2,796,460

SWITCHING CIRCUIT

Roy K. Andres, Glen Cove, N. Y., and James S. Harris, Old Greenwich, Conn., assignors to Radio Corporation of America, a corporation of Delaware Application September 29, 1955, Serial No. 537,393

7 Claims. (Cl. 178—2)

Figures 1, 7:
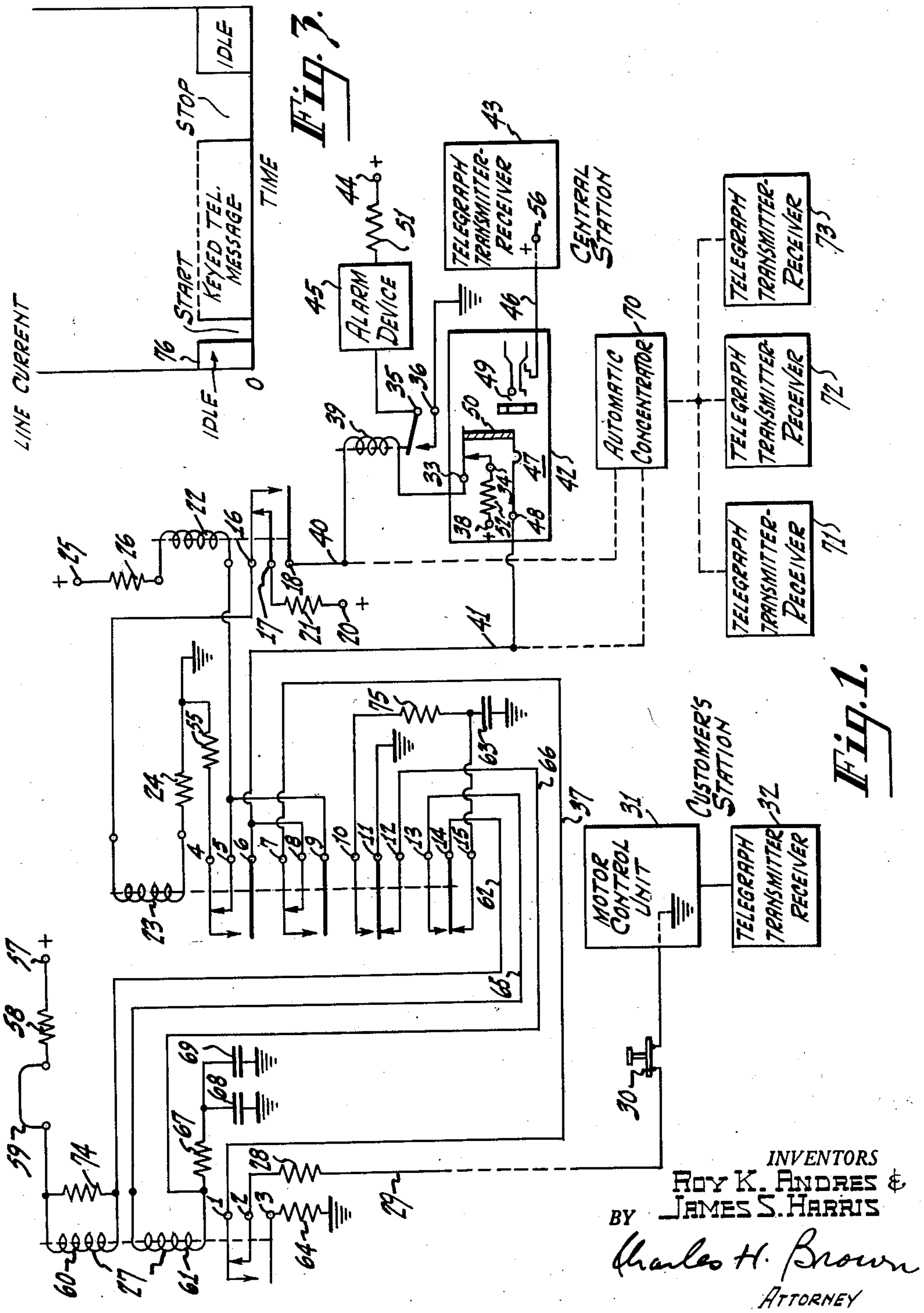

This invention relates to switching circuits and in particular to a switching circuit adaptable for use in a telegraph communication system to electrically interconnect a telegraph station designed to operate over a single conductor telegraph transmission line and a telegraph station designed to operate over a two conductor telegraph transmission line.

In a two conductor telegraph transmission line system, the telegraph stations included in the system are electrically interconnected by a pair of wires, one of the wires being used for control purposes and the other, the signal wire, being used to carry the keyed telegraph signals between the stations. For example, in a system including a central station and a plurality of customer or subscriber stations which are located at various distances from the central station, each of the customers' stations is electrically connected to a concentrator switchboard at the central station via a pair of conductors. When a signal is to be transmitted between one of the customers' stations and the central station, the concentrator includes relay circuitry which operates to start and stop a transmitting-receiving device at the customer's station by applying a potential to or removing a potential from one of the conductors interconnecting the stations, the particular conductor used being termed the control wire. The actual keyed telegraph signals transmitted between the stations are carried by the second or signal wire of the two conductors interconnecting the stations.

The single conductor telegraph transmission line system operates in a different manner. The telegraph stations included in the system are electrically interconnected by a single wire, the wire being used for both control and signal purposes. A motor control unit is located at each of the stations and responds to interruptions of predetermined duration in line current applied to the single wire to operate transmitting-receiving devices at the stations. In this sense, the single wire acts as a control line by carrying such control information between the stations of the system. However, when a transmitting-receiving device at one of the stations is placed in operation by a motor control unit to send or receive a signal, the signal is carried over the same single wire interconnecting the stations of the system and, in this sense, the single wire also acts as a signal line.

In certain communication systems, it is desirable to be able to include a telegraph station designed to operate over a single conductor transmission line system as part of a transmission system designed to operate over a two conductor telegraph transmission line system. A coupling device must be provided to make the two types of operation compatible to permit an interconnection of the station or stations of the two conductor system and the station of the single conductor system.

Therefore, the invention has as one of its objects the provision in a telegraph communication system of a novel type of switching circuit automatically operated to electrically interconnect a telegraph station designed to operate over a single conductor telegraph transmission line and a central station concentrator or telegraph station designed to operate over a two conductor telegraph transmission line.

It is a further object of the invention to provide a novel type of switching circuit for use in a telegraph communication system to supply the necessary interconnections and timing functions whereby a telegraph station designed to operate over a single conductor telegraph transmission line system can be operatively connected in a two conductor telegraph transmission line system.

Briefly, the invention is an electromagnetic relay switching circuit which is installed as an adjunct unit at a telegraph station included in a telegraph communication system. The communication system includes a telegraph station designed to operate over a single conductor transmission line and a telegraph station designed to operate over a two conductor transmission line. The switching circuit of the invention may be installed at either of the two stations. However, for purposes of description, the switching circuit is described as being installed at the station designed to operate over a two conductor transmission line. By locating the switching circuit at the station designed to operate over a two conductor transmission line, the two stations may then be interconnected by a single conductor line effecting an economy in wire. The conductors of the two conductor line, a control wire and a signal wire, are connected to the switching circuit. The telegraph station designed to operate over the single conductor telegraph transmission line is electrically connected to the switching circuit by a single conductor transmission line. As the two stations are remote from one another, the single conductor line may be a standard land wire line used in telegraph communication or may include a radio frequency transmission system, as is well known in the art.

The switching circuit includes a plurality of relay devices which operate in standby condition to complete an electrical path such that an idle line current is carried over the single conductor line interconnecting the stations. Control means are provided at each station for altering the operation of the relay devices in the switching circuit. When an operator at either of the stations desires to complete a call, the control means located at the station originating the call are operated. The single conductor line interconnecting the stations is connected through the switching circuit to the signal wire interconnecting the switching circuit and the telegraph operating equipment at the telegraph station designed to operate over the two conductor transmission line system. The switching circuit automatically functions to interrupt a line current applied to the single conductor line for a period of predetermined duration. A motor control unit located at the telegraph station designed to operate over the single conductor transmission line system responds to the interruption in the line current to start the operation of a transmitting-receiving device at that station. The operation of the control means at the station originating the call also serves to start the operation of a transmitting-receiving device at the station which is designed to operate over the two conductor transmission line system.

An operating circuit between the two stations is completed including the single conductor line interconnecting the stations and the signal wire of the two conductor line interconnecting the switching circuit and the telegraph operating equipment at the station designed to operate over the two conductor transmission line system and keyed telegraph signals are carried thereover. Upon the completion of the transmission of a telegraph signal sent over the operating circuit, the control means at the station designed to operate over a two conductor transmission line are operated to return the operation of the relay devices in the switching circuit to standby condition, An electrical path is again completed such that a normal idle line current is applied to the single conductor line interconnecting the stations. The switching circuit automatically operates to again interrupt the line current for a period of predetermined duration but of longer duration than the first-mentioned interruption. The motor control unit at the station designed to operate in a single conductor transmission line system operates in response to the second interruption to stop the operation of the transmitting-receiving device at that station. The control means at the station designed to operate over the two conductor transmission line system also operates to stop the operation of the transmitting-receiving device at that station and the communication system is returned to the original or standby condition.

Figure 2:
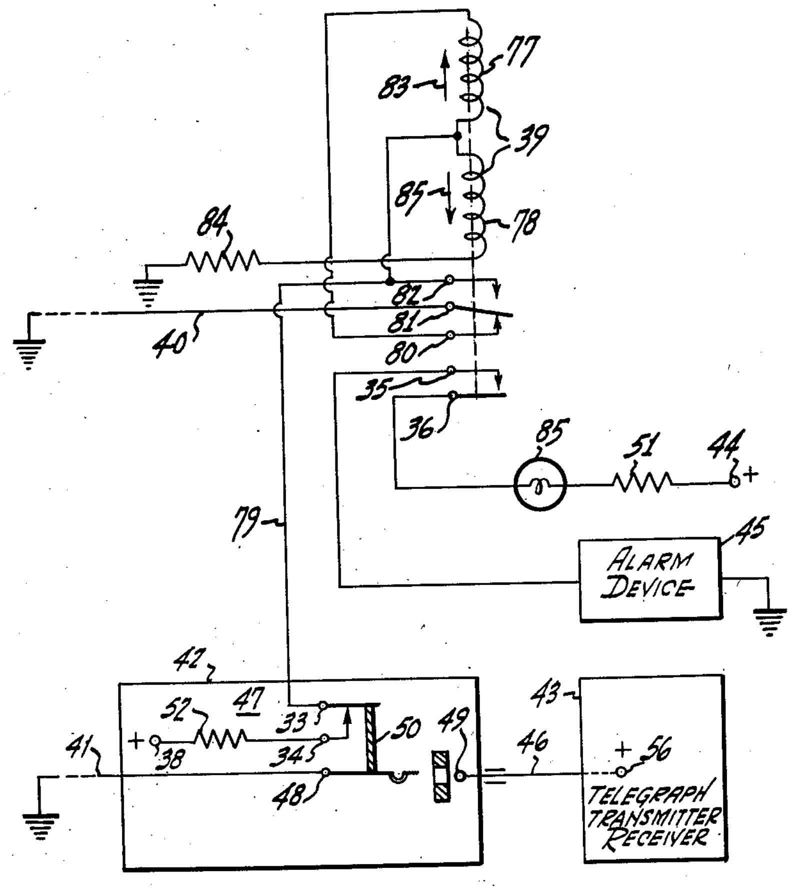

A more detailed description of the invention follows with reference to the accompanying drawing in which:

Figure 1 discloses a circuit diagram of one embodiment of a switching circuit constructed according to the invention;

Figure 2 is a modified embodiment of the energizing circuit of the alarm device included in the circuit diagram of Figure 1, and Figure 3 is a graphic representation of the manner in which a normal idle line current applied to the single conductor line interconnecting the two telegraph stations is interrupted by the operation of the switching circuit shown in Figure 1.

Referring to Figure 1, there is shown a circuit diagram of one embodiment of a switching circuit constructed according to the invention. A manually attended concentrator switchboard 42 is located at a central telegraph station designed to operate over a two conductor transmission line system and includes a plurality of jack positions. A fully automatic concentrator 70 is shown as an alternate central office termination and is used with equal facility. However, for purposes of simplification the detained sequence of operation described herein will refer to the manually attended concentrator. The central station also comprises a plurality of telegraph transmitting-receiving devices, one of the devices 43 being shown in Figure 1. The telegraph transmitting-receiving devices are selectively connected through the concentrator 42 to similar telegraph devices at customers' stations remotely located in relation to the central station. Each of the customers' stations is individually connected to one of the jack positions of the concentrator 42 to complete an operating circuit between the respective customer's stations and the central station. One of the jack positions 47 of the concentrator 42 is shown in Figure 1. It is to be understood that the central station concentrator circuitry, shown as 42, and the associated relay 39 has been greatly simplified to illustrate the principle of two wire concentrator operation with the invention described herein.

The switching circuit of the invention including relays 22, 23 and 27 is installed at the central station. The switching circuit is connected to the jack position 47 of the concentrator switchboard 42 by means of wires 40 and 41. The concentrator switchboard 42 is designed in such a manner that wire 40 is adapted to operate only as a control line and wire 41 is adapted to operate only as a signal line. In normal operation, the two wires 40 and 41 are connected from the jack position 47 at the concentrator 42 to a remote customer's station. By applying a potential to or removing a potential from the control line 40, the concentrator switchboard 42 completes an operating circuit between telegraph equipment at the customer's station and at the central station, whereby keyed telegraph signals are carried over wire 41 between the stations. Two separate conductors or wires are required. One is needed for control purposes and the other carries the telegraph signals.

A particular communication system, however, may require the connection of a customer's station designed to operate over a single conductor transmission line system to the jack position 47 of the concentrator 42. The operation of a single conductor transmission line system by means of motor control units is well known in the art and a detailed description of the operation thereof is unnecessary. The single conductor line in a single conductor transmission line system is used for both control and signal purposes and is incompatible in the absence of a suitable coupling device with the two conductor line arrangement of the concentrator 42.

The customer's station includes a push-button switch 30, a motor control unit 31 and a telegraph transmitting-receiving device 32. The customer's station is electrically connected to the central station and, particularly, to the switching circuit of the invention by a wire 29. Wire 29 may be a land wire line or may include a radio frequency transmission system, as is well known in the telegraph art. The customer's station is, therefore, connected to the jack position 47 of the concentrator 42 at the central station through the switching circuit including relay devices 22, 23 and 27, the switching circuit also being located at the central station.

Upon the original operation of the switching circuit, a path is completed from the positive terminal 20 of a source of potential, not shown, to ground including resistor 21, contacts 17 and 16 of relay 22, the winding of relay 23 and resistor 24. The winding of relay 23 is energized and relay 23 is operated. The term ground, as used in the specification, is to be considered as a point of fixed reference potential. A path is then completed from the positive terminal 25 of a source of potential, not shown, to ground including resistor 26, the winding of relay 22, armature 9 and contact 7 of relay 23, lead 37, contacts 1 and 2 of relay 27, resistor 28, wire 29, push-button switch 30 and the motor control unit 31. The winding of relay 22 is energized and relay 22 is operated. Upon the operation of relay 22, a path is completed from a positive terminal 38 of a source of potential, not shown, to ground including resistor 52, contact 34 and armature 33 of jack position 47 of the concentrator switchboard 42, the winding of relay 39, wire 40, armature 18 and contact 16 of relay 22, the winding of relay 23 and resistor 24. The winding of relay 39 is energized and relay 39 is operated. The contacts of relay 22 are arranged in such a manner that the armature 18 engages contact 16 before contacts 16 and 17 are opened by the operation of the armature 18 of the relay. The winding of relay 23 having already been energized by a path including contacts 16 and 17 of relay 22, the winding of relay 23 will continue to be energized without interruption by the path including armature 18 and contact 16 of relay 22, completed upon the operation of relay 22, and relay 23 will continue to be operated. By means of the electrical path including the positive terminal 25 and the wire 29, a normal idle line current is applied to wire 29 which may, for example, be a 60 ma. line current. In standby condition, therefore, relays 22 and 23 of the switching circuit are operated and an idle line current is applied to wire 29.

It will first be assumed that an operator at the customer's station wishes to transmit a telegraph signal to the central station. The operator will first operate the push-button 30 or a similar device which momentarily opens wire 29, disconnecting the ground connection from the winding of relay 22. Relay 22 is inactivated causing armature 18 to disengage contact 16 of relay 22. Contacts 16 and 17 of relay 22, however, close maintaining the operating circuit of relay 23 by completing an electrical path including the positive terminal 20. The ground connection to the winding of relay 39 is broken by the release of the armature 18 of relay 22 upon the inactivation of the relay 22. Relay 39 is inactivated and a path is completed from a positive terminal 44 of a source of potential, not shown, to ground including resistor 51, an alarm device 45 and armature 35 and contact 36 of relay 39. The alarm device 45 may be a bell, a lamp or any type of indicating circuit and is energized upon the inactivation of relay 39 to alert an operator at the central station to the incoming call. Upon the release of the push-button 30 by the operator at the customer's station, the operating circuit of relay 22 is again completed and relay 22 is reoperated. The idle line current is again applied to the wire 29. Upon the operation of relay 22, armature 18 engages contact 16 and opens contacts 16 and 17 of relay 22. Relay 23 remains operated and, the operating circuit of relay 39 having been completed, relay 39 is reoperated. Armature 35 disengages contact 36 of relay 39 and the original energizing circuit of alarm device 45 is broken.

An operator at the central station in response to the operation of the alarm device 45 plugs a drop cord 46 connected to an available telegraph transmitting-receiving device 43 into the jack position 47. The insertion of the plug 49 connected to the drop cord or lead 46 into the jack position 47 causes the armature 48 of the jack 47 to rise, a bar 50 of non-conducting material connected to the armature 48 serving to disengage the armature 33 and contact 34 of the jack 47. By opening the contacts of the jack 47, the positive terminal 38 is disconnected from the windings of relays 39 and 23 and both relays are inactivated. Contact 36 and armature 35 of relay 39 engage, and the alarm device 45 is energized. The alarm device 45 may include a panel lamp, not shown, which is energized to indicate the busy condition of jack 47. Upon the inactivation of relay 23, armature 6 disengages contact 4 of relay 23 and contacts 4 and 5 of relay 23 close. Relay 22 remains operated by a path completed from the winding of the relay to ground including contacts 4 and 5 of relay 23 and resistor 55. Contacts 4 and 5 close before armature 6 disengages contact 4 of relay 23 and the operating circuit of relay 22 is not broken by the inactivation of relay 23. Armature 9 disengages contact 7 of relay 23 and contacts 7 and 8 of relay 23 close. A path is completed from a positive terminal 56 of a source of potential, not shown, at the telegraph transmitting-receiving device 43 at the central station to ground including drop cord 46, plug 49, armature 48 of jack position 47 of concentrator 42, wire 41, contacts 8 and 7 of relay 23, lead 37, contacts 1 and 2 of relay 27, wire 29, push-button 30 and motor control unit 31. A line current is maintained on wire 29 and, as contacts 7 and 8 of relay 23 close before the armature 9 disengages contact 7 of the relay, there will be no interruption in the line current carried by the wire 29. Another path is completed from the positive terminal 57 of a source of potential, not shown, to ground including resistor 58, jumper lead 59, one of the windings 60 of relay 27, lead 62, armature 14 and contact 15 of relay 23 and a capacitor 63. A charging current pulse, determined by the time constant of capacitor 63, the resistance of winding 60 and the series resistor 58 energizes the winding 60 momentarily, causing armature 3 to engage contact 1 of relay 27, opening the contacts 1 and 2 of the relay 27. The opening of contacts 1 and 2 of relay 27 interrupts the line current on wire 29. It is to be noted that the positive terminal 56 of the telegraph transmitting-receiving device 43 at the central station continues to be connected to ground through contact 1 and armature 3 of relay 27 and resistor 64. As armature 3 engages contact 1 before contacts 1 and 2 of relay 27 open, no interruption in the operating circuit of device 43 occurs, thereby avoiding any improper operation thereof. The momentary operation of relay 27 and the interruption of the line current carried by wire 29 is of a predetermined duration. The motor control unit 31 at the customer's station operates in response to the interruption or short open on the wire 29 to start the telegraph transmitting-receiving device 32 in operation. When the charging current of capacitor 63 has dropped below the minimum holding current of relay 27, relay 27 is inactivated and a path is completed from the telegraph transmitting-receiving device 32 at the customer's station to the telegraph transmitting-receiving device 43 at the central station including wire 29, contacts 1 and 2 of relay 27, lead 37, contacts 7 and 8 of relay 23, wire 41, armature 48 of jack 47, plug 49 and drop cord 46. An operating circuit is completed between the customer's station and the central station. The telegraph device 32 at the customer's station then proceeds to transmit a telegraph signal over the communication system to telegraph device 43 at the central station.

Upon the completion of the transmission of the telegraph signal and of the call, the operator at the central station withdraws the drop cord 46 from the jack position 47 of the concentrator 42. Armature 33 engages contact 34 and the positive terminal 38 is connected through the winding of relay 39 and the contacts of relay 22 to the winding of relay 23. The windings of relays 23 and 39 are energized and relays 23 and 39 are operated. Contact 36 and armature 35 of relay 39 are disengaged, and alarm device 45 is inactivated. Upon the operation of relay 23, contacts 4 and 5 are opened by the action of the armature 6 engaging contact 4 of the relay 23. The winding of relay 22, instead of being connected to ground by a path including contacts 4 and 5 of relay 23 and resistor 55, is connected to ground by a path including armature 9 and contact 7 of relay 23, lead 37, contacts 1 and 2 of relay 27, wire 29, push-button 30 and the motor control unit 31. In other words, wire 29 is disconnected from the concentrator 42 via wire 41 by the operation of relay 23 and is, instead, connected through the winding of relay 22 to the positive terminal 25. An idle line current is applied to wire 29 in the same manner as previously described. Upon the operation of relay 23, a path is also completed from the positive terminal 57 to ground including resistor 58, jumper lead 59, the winding 60 of relay 27, lead 62, contacts 14 and 13 of relay 23, lead 65, the winding 61 of relay 27, resistor 67 and capacitors 68 and 69. Both windings 60 and 61 of relay 27 are connected in series. A charging current pulse, determined by the time constant of capacitors 68 and 69, the resistance of the windings 60 and 61 and series resistors 67 and 58, momentarily operates relay 27, causing armature 3 to engage contact 1, opening contacts 1 and 2 of relay 27. The idle line current applied to wire 29 is interrupted by the opening of contacts 1 and 2 of relay 27. This interruption is of longer duration than that produced by the longest possible code character transmitted over the communication system, thereby allowing the motor control unit 31 to distinguish between this interruption and normal code characters and thus preventing the motor control unit 31 from operating in response to a code character included in a keyed telegraph signal. The motor control unit 31 operates in response to the interruption of predetermined duration to stop the operation of the telegraph transmitting-receiving device 32 at the customer's station. Following the charging of capacitors 68 and 69, relay 27 will be inactivated and contacts 1 and 2 of relay 27 are closed. A full cycle of operation of the switching circuit is completed and the circuit is returned to the original standby condition with relays 22 and 23 operated and an idle line current being applied to wire 29.

It should be noted that in the operation of the switching circuit, when relay 23 is operated, both sides of capacitor 63 are connected to ground by the closing of contacts 10 and 11 of relay 23. When relay 23 is inactivated, both sides of capacitors 68 and 69 are connected to ground by the closing of contacts 11 and 12 of relay 23. By so grounding the capacitors, the proper application of the charging current pulses to the windings 60 and 61 of relay 27 is ensured.

The alarm device 45, of course, may be arranged to operate in any manner desired in accordance with the operation of relay 39 and may be included in a circuit which will continue to energize the alarm device 45 until the device is shut off by the operation of control means at the central station rather than by the reactivation of relay 39. Referring to Figure 2, there is shown a modified embodiment of the energizing circuit of the alarm device 45, shown in Figure 1. By the use of the arrangement shown in Figure 2, the alarm device 45, once energized, continues to be energized until an operator alerted by the alarm device 45 connects the telegraph transmitter-receiver 43 to the jack 47 by means of plug 49 and lead 46. Any change in the operating condition of the relays 22, 23 and 27 of the switching circuit, as shown in Figure 1, has no effect on the operation of alarm device 45, once the alarm device 45 is energized. The operation of relays 22, 23 and 27 is exactly the same as was previously described. Relay 39, however, is shown in Figure 2 as a differential relay including two windings 77 and 78 arranged to be oppositely polarized. When the switching circuit of the invention is in standby condition, the positive terminal 38 is connected to ground over a path including resistor 52, contact 34 and armature 33 of jack 47, lead 79, winding 77 of relay 39, contact 80 and armature 81 of relay 39 and wire 40. Winding 77 is polarized in the direction of arrow 83. A second path is also completed from the positive terminal 38 to ground and includes lead 79, winding 78 of relay 39 and resistor 84. Winding 78 is polarized in the direction of arrow 85. As windings 77 and 78 of relay 39 are oppositely polarized from the same positive terminal 38, the windings offset one another and relay 39 remains inoperative. As described in connection with Figure 1, an operator by operating the switch 30 at the customer's station, applies an open condition on the wire 40. The ground connection is removed from winding 77 of relay 39, inactivating winding 77. However, as winding 78 of relay 39 remains energized, relay 39 is operated. Armature 81 disengages contact 80 and engages contact 82. Positive terminal 38 is now connected to wire 40 via armature 81 and contact 82, the positive terminal 38 being disconnected from the winding 77. Armature 36 and contact 35 of relay 39 are engaged and a path is completed from the positive terminal 44 to ground including resistor 51, lamp 85 and alarm device 45. Alarm device 45 is energized alerting an operator at the central station to the incoming call. The lamp 85, which is also energized, may be included in a suitable control panel, not shown.

When the operator at the customer's station releases switch 30, wire 40 is again connected to ground. A path is completed from positive terminal 38 to ground including lead 79, contact 82 and armature 81 of relay 39 and wire 40, restoring a normal idle line current to wire 29, shown in Figure 1. Winding 77 of relay 39 remains inactivated, and relay 39 remains operated. Alarm device 45, which may be a bell or other indicating device, also remains energized. An operator at the central station, in response to the alarm device 45 and/or lamp 85 connects the telegraph transmitter-receiver 43 to the jack 47 by means of the plug 49 and lead 46. The insertion of the plug 49 in jack 47 causes the bar 50 to disengage armature 33 and contact 34, disconnecting the positive terminal 38 from the winding 78 of relay 39 and from wire 40. As both windings 77 and 78 of relay 39 are now inactivated, relay 39 becomes inoperative. Armature 81 disengages contact 82 and engages contact 80. Armature 36 disengages contact 35 and breaks the operating circuit of alarm device 45 and lamp 85, the alarm device 45 and lamp 85 being inactivated. A path is completed from the positive terminal 56 included in the telegraph transmitter-receiver 43 to ground including lead 46, plug 49, armature 48 and wire 41, wire 41 being connected through the switching circuit of the invention to wire 29 and to the telegraph transmitter-receiver 32 at the customer's station. Message traffic is then sent between the customer's station and the central station in a normal manner. Alarm device 45 and lamp 85 remain inactivated during the period in which message traffic is forwarded between the customer's station and the central station. Upon the completion of the message traffic, the operator at the central station removes the plug 49 from jack 47. The positive terminal 38 is again connected to both windings 77 and 78 of relay 39 and to wire 40, maintaining a normal idle line current on wire 29 interconnecting the customer's station and the central station. As the windings 77 and 78 are in a bucking relationship, relay 39 remains inoperative, and the relay 39, as well as relays 22, 23 and 27 of the switching circuit, are maintained in standby condition. The operation of the invention including the arrangement shown in Figure 2 is exactly the same as the operation of the invention including the simplified arrangement shown in Figure 1. The only distinction is that, in the arrangement shown in Figure 2, the alarm device 45 continues to be energized until an operator at the central station has responded to the incoming call. In the arrangement shown in Figure 1, the alarm device 45 is automatically inactivated upon the reactivation of relay 39 following the release of the switch 30 by the operator at the customer's station and before an operator at the central station has responded to the call.

Figure 3 is a graphic representation of the manner in which the switching circuit of the invention provides the necessary timing functions to operate the motor control unit 31 at the customer's station. The line current 76 applied to wire 29 is first interrupted for a period of predetermined duration. The motor control unit 31 in response to the interruption starts the operation of the telegraph transmitting-receiving device 32 at the customer's station. Thereafter, a keyed telegraph signal is carried by wire 29, as indicated by the dotted line section of the line current 76 shown in Figure 3. When the signal is completed, the line current 76 is again interrupted for a period of predetermined duration. The motor control unit 31 operates in response to the second interruption in the line current 76 to stop the operation of the telegraph device 32. The respective interruptions in the line current 76 are indicated in Figure 3 by the terms "start" and "stop." The actual duration of the interruptions must be determined in accordance with the equipment available and the operation desired. In a swtiching circuit constructed according to the invention and adapted for use in a 5-unit code character telegraph transmission system, the "start" interruption in the line current 76 was approximately twenty-two milliseconds in duration, while the "stop" interruption in the line current was approximately eight-tenths of a second in duration.

When an operator at the central station wishes to call the customer's station, the operator need only insert the plug 49 and drop cord 46 connected to the transmitting-receiving device 43 into the jack position 47 of concentrator 42. The switching circuit, thereafter, operates in exactly the same manner as outlined above to complete an operating circuit between the central station and the customer's station. As the call originates at the central station, the sequence of operation of the switching circuit will start with the insertion of the drop cord 46 and plug 49 into the jack position 47 of concentrator 42. The energization of alarm device 45 is not necessary and the steps in the operation of the switching circuit to cause the energization of alarm device 45 upon the operation of the push-button switch 30 at the customer's station are by-passed, the operation of the switching circuit starting upon the connection of the telegraph device 43 to the concentrator 42 at the central station. An operating circuit is completed between the stations and, upon the completion of the call, the switching circuit and the communication system including the stations is returned to the original or standby condition. With the exception of the energization of the alarm device 45 at the central station when a call originates at the customer's station, the switching circuit of the invention operates in exactly the same manner whether a call originates at the central station or at the customer's station.

Reference has been made to the jumper lead 59 included in the operating circuit of relay 27. It is by the operation of relay 27 that the switching circuit provides the timing functions necessary to operate the motor control unit 31 at the customer's station. By momentarily operating relay 27, the line current applied to wire 29 is interrupted for periods of predetermined duration. The transmitting-receiving device 32 at the customer's station may be set to operate continually, even when not sending or receiving a keyed telegraph signal via wire 29. In such a situation, it is unnecessary to operate the motor control unit 31 as the telegraph device 32 is continually in operation. Jumper lead 59 is removed, breaking the operating circuit of relay 27. The switching circuit will operate, as previously described, to provide the necessary interconnections between the central station and the customer's station. However, as relay 27 cannot be operated, the switching circuit will not provide the timing functions necessary to operate motor control unit 31. By the use of the jumper lead 59, therefore, the switching circuit is controlled to provide or not to provide the timing functions, as desired.

The description of the switching circuit of the invention has been given in connection with a manually operated concentrator switchboard 42 at the central station. The invention, however, is not limited to use only with a manual telegraph concentrator. As shown by the dotted lines in Figure 1, the wires 40 and 41 can be connected, instead, to an automatic concentrator switchboard 70 to which are connected a plurality of telegraph transmitting-receiving devices 71, 72 and 73. The operation of the switching circuit when used in conjunction with an automatic concentrator 70 is exactly the same as when used in conjunction with a manual concentrator 42. The control information necessary to operate the automatic concentrator 70 is carried over wire 40 by the operation of the switching circuit. The automatic concentrator 70 operates to complete an operating circuit including wire 29 and wire 41 between the transmitting-receiving device 32 at the customer's station and one of the transmitting-receiving devices 71, 72 or 73 at the central station, when a call is made by either the customer's station or the central station.

Typical values of the component parts given by way of example are as follows:

| | | |
|---|---|---|
| Capacitor **63** | mfd | 1 |
| Capacitor **68** | mfd | 10 |
| Capacitor **69** | mfd | 10 |
| Resistor **21** | ohms | 500 |
| Resistor **24** | do | 1200 |
| Resistor **26** | do | 1200 |
| Resistor **28** | do | 2000 |
| Resistor **55** | do | 500 |
| Resistor **58** | do | 2000 |
| Resistor **64** | do | 500 |
| Resistor **67** | do | 12000 |
| Resistor **74** | do | 47000 |
| Resistor **75** | do | 47000 |

Having described the invention, we claim:

1. A telegraph communication system including first and second stations, a switching circuit electrically interconnecting said stations, said switching circuit being connected to said first station by a first conductor, said switching circuit being connected to said second station by second and third conductors, independently operable means at each of said stations to cause said switching circuit to operate in a predetermined sequence to selectively apply control information to said stations over said first and said second conductors, means located at said first station responsive to said control information received thereat from said switching circuit to operate a first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means, whereby each of said transmitting-receiving devices may be operated to send and receive telegraph signals, said switching circuit also being responsive to the operation of said operable means at either of said stations to complete an electrical path between said transmitting-receiving devices at said stations including said first and said third conductors to carry telegraph signals thereover.

2. A telegraph communication system including first and second stations, an electromagnetic relay switching circuit comprising a plurality of relay devices electrically interconnecting said stations, said switching circuit being connected to said first station by a first conductor, said switching circuit being connected to said second station by second and third conductors, independently operable means at each of said stations to cause said switching circuit to operate in a predetermined sequence to selectively apply control information to said stations over said first conductor and said second conductor, means located at said first station responsive to said control information received thereat from said switching circuit to operate a first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means, whereby each of said transmitting-receiving devices may be operated to send and receive telegraph signals, said switching circuit also being responsive to the operation of said operable means at either of said stations to complete an electrical path including said first and said third conductors between said transmitting-receiving devices at said stations to carry telegraph signals thereover.

3. A telegraph communication system including first and second stations, a switching circuit electrically interconnecting said stations, said first station comprising a motor control unit and a first transmitting-receiving device, said switching circuit being connected to said motor control unit by a first conductor, said switching circuit being connected to said second station by second and third conductors, independently operable means at each of said stations to cause said switching circuit to operate in a predetermined sequence to selectively apply control information to said stations over said first conductor and said second conductor, said motor control unit being responsive to said control information to operate said first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means whereby each of said transmitting-receiving devices may be operated to send and receive telegraph signals, said switching circuit also being responsive to the operation of said operable means at either of said stations to complete an electrical path including said first conductor and said third conductor between said transmitting-receiving devices at said stations to carry telegraph signals thereover.

4. A telegraph communication system including first and second stations, an electromagnetic relay switching circuit including a plurality of relay devices electrically interconnecting said stations, said first station comprising a motor control unit and a first transmitting-receiving device, said switching circuit being connected to said motor control unit by a first conductor, said switching circuit being connected to said second station by second and third conductors, independently operable means at each of said stations to cause said relay devices to operate in a predetermined sequence to selectively apply control information to said stations over said first conductor and said second conductor, said motor control unit being responsive to said control information to operate said first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means, whereby each of said transmitting-receiving devices may be operated to send and receive telegraph signals, said relay devices also being responsive to the operation of said operable means at either of said stations to complete an electrical path including said first and said third conductors between said transmitting-receiving devices at said stations to carry telegraph signals thereover.

5. A telegraph communication system including first and second stations, a switching circuit electrically interconnecting said stations, said first station comprising a motor control unit and a first transmitting-receiving device, said switching circuit being connected to said motor control unit by a first conductor to which is applied a line current, said switching circuit being connected to said second station by a second and third conductor, independently operable means at each of said stations to cause said switching circuit to operate to momentarily interrupt said line current for a period of given duration, said motor control unit being responsive to said interruption to start the operation of said first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means, whereby each of said transmitting-receiving devices may be operated to send and receive telegraph signals, said switching circuit also being responsive to the operation of said operable means at either of said stations to complete an electrical path including said first and said third conductors adapted to carry telegraph signals between said transmitting-receiving devices, the line current applied to said first conductor being keyed in accordance with said telegraph signals, said connecting means being arranged to be operated upon the completion of the transmission of said telegraph signals over said electrical path to render said second transmitting-receiving device inoperative and to operate said operable means at said second station to cause said switching circuit to operate to momentarily interrupt said line current for a period of given duration, said motor control unit being responsive to said second interruption to render said first transmitting-receiving device inoperative.

6. A telegraph communication system including first and second stations, an electromagnetic relay switching circuit including a plurality of relay devices electrically interconnecting said stations, said first station comprising a motor control unit and a first transmitting-receiving device, said switching circuit being connected to said motor control unit by a first conductor to which a line current is applied, said switching circuit being connected to said second station by second and third conductors, independently operable means at each of said stations to cause said relay devices to operate in a predetermined sequence to momentarily interrupt said line current for a period of given duration, said motor control unit being responsive to said interruption to start the operation of said first transmitting-receiving device, a second transmitting-receiving device, means for connecting said second transmitting-receiving device to said operable means at said second station to start said second transmitting-receiving device in operation, said operable means at said second station being arranged to operate in response to the operation of said connecting means, whereby each of said transmitting-receiving devices may be operated to send and receive telegraph signals, the operation of said relay devices in response to the operation of said operable means at either of said stations also completing an electrical path including said first and said third conductors adapted to carry telegraph signals between said transmitting-receiving devices, the line current applied to said first conductor being keyed in accordance with said telegraph signals, said connecting means being arranged to be operated upon the completion of the transmission of said telegraph signals over said electrical path to render said second transmitting-receiving device inoperative and to operate said operable means at said second station to alter the operation of said relay devices to momentarily interrupt said line current for a period of given duration, said motor control unit being responsive to said second interruption to render said first transmitting-receiving device inoperative.

7. A telegraph communication system including first and second stations, an electromagnetic switching circuit including a plurality of relay devices electrically interconnecting said station, said first station comprising a motor control unit and a first transmitting-receiving device, said switching circuit being connected to said motor control unit by a first conductor to which a line current is applied, said switching circuit being connected to said second station by second and third conductors, independently operable means at each of said stations to cause said relay devices to operate in a predetermined sequence, one of said relay devices being operated by a charging pulse developed in a first capacitive network to momentarily interrupt said line current for a period of given duration, said motor control unit being responsive to said interruption to start the operation of said first transmitting-receiving device, a second transmitting-receiving device, means for connecting said second transmitting-receiving device to said operable means at said second station to start said second transmitting-receiving device in operation, said operable means at said second station being arranged to be operated in response to the operation of said connecting means, whereby each of said transmitting-receiving devices may be operated to send and receive telegraph signals, the operation of said relay devices in response to the operation of said operable means at either of said stations also completing an electrical path including said first and said third conductors adapted to carry said telegraph signals between said transmitting-receiving devices, the line current applied to said first conductor being keyed in accordance with said telegraph signals, said connecting means being arranged to be operated upon the completion of the transmission of said telegraph signals over said electrical path to render said second transmitting-receiving device inoperative and to operate said operable means at said second station to alter the operation of said relay devices such that said one of said relay devices is operated by a charging pulse developed in a second capacitive network to momentarily interrupt said line current for a period of given duration, said motor control unit being responsive to said second interruption to render said first transmitting-receiving device inoperative.

References Cited in the file of this patent

UNITED STATES PATENTS

| | | |
|---|---|---|
| 2,473,346 | Richards | June 14, 1949 |
| 2,557,943 | Clemens | June 26, 1951 |
| 2,602,117 | Oberman | July 1, 1952 |